(12) United States Patent
Drury et al.

(10) Patent No.: US 12,019,528 B2
(45) Date of Patent: *Jun. 25, 2024

(54) CENTRALIZED SERVER MANAGEMENT FOR SHADOW NODES

(71) Applicant: SOFTIRON LIMITED, Chilworth (GB)

(72) Inventors: Robert Drury, Louth (GB); Andrew McNeil, Ipswich (GB); Harry Richardson, Lamarsh (GB); Stephen Hardwick, Austin, TX (US); Phillip Edward Straw, Newark, CA (US); Alan Ott, Oviedo, FL (US)

(73) Assignee: SOFTIRON LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,290

(22) Filed: Aug. 24, 2021

(65) Prior Publication Data
US 2022/0066890 A1  Mar. 3, 2022

Related U.S. Application Data (60) Provisional application No. 63/192,400, filed on May 24, 2021, provisional application No. 63/070,086, filed on Aug. 25, 2020.

(51) Int. Cl.
*G06F 11/20* (2006.01)
*G06F 9/4401* (2018.01)
(Continued)

(52) U.S. Cl.
CPC ........ *G06F 11/2025* (2013.01); *G06F 9/4416* (2013.01); *G06F 9/4418* (2013.01);
(Continued)

(58) Field of Classification Search
CPC .. G06F 11/2025; G06F 9/4416; G06F 9/4418; G06F 11/0793; G06F 11/08;
(Continued)

(56) References Cited

U.S. PATENT DOCUMENTS

| | | | | |
|---|---|---|---|---|
| 2007/0180314 A1* | 8/2007 | Kawashima | ........ | G06F 11/2046 714/15 |
| 2007/0300293 A1 | 12/2007 | Tsutsui et al. | ..................... | 726/5 |

(Continued)

FOREIGN PATENT DOCUMENTS

| | | | | |
|---|---|---|---|---|
| CN | 105915637 A | 8/2016 | ............. | H04L 12/10 |
| EP | 2613262 A2 | 7/2013 | ............... | G06F 1/32 |

(Continued)

OTHER PUBLICATIONS

International Search Report and Written Opinion, Application No. PCT/EP/2021/072206, 12 pages, dated Nov. 10, 2021.

(Continued)

*Primary Examiner* — Bryce P Bonzo
*Assistant Examiner* — Michael Xu
(74) *Attorney, Agent, or Firm* — Slayden Grubert Beard PLLC (57) ABSTRACT

An apparatus includes a communications interface and a management server. The management server is configured to access servers through the interface, determine that additional resources are needed for execution by a system, and determine that one of the servers is in a standby mode. In the standby mode, the server is powered down and a baseboard management controller (BMC) therein is only powered through a connection from the apparatus or another server of the network. The management server is configured to determine that additional resources for execution by the system from the server are to be activated and cause a wake-up signal to be sent to the BMC, wherein the wake-up signal is (Continued)

configured to cause the BMC to wake and provision the operating environment of the server.

18 Claims, 3 Drawing Sheets

(51) Int. Cl.
    *G06F 11/07*         (2006.01)
    *G06F 11/08*         (2006.01)
    *G06F 11/30*         (2006.01)

(52) U.S. Cl.
    CPC .......... *G06F 11/0793* (2013.01); *G06F 11/08* (2013.01); *G06F 11/2005* (2013.01); *G06F 11/2028* (2013.01); *G06F 11/2033* (2013.01); *G06F 11/2041* (2013.01); *G06F 11/2048* (2013.01); *G06F 11/3055* (2013.01); *G06F 2201/805* (2013.01)

(58) Field of Classification Search
    CPC ............. G06F 11/2005; G06F 11/2028; G06F 11/2033; G06F 11/2041; G06F 11/2048; G06F 11/3055; G06F 2201/805; G06F 1/28; G06F 1/30; G06F 1/3287; G06F 1/3209; Y02D 10/00
    See application file for complete search history.

(56) References Cited

U.S. PATENT DOCUMENTS

| | | | |
|---|---|---|---|
| 2009/0248827 A1 | 10/2009 | Hazra et al. | 709/207 |
| 2009/0260081 A1 | 10/2009 | Johnson et al. | 726/22 |
| 2013/0212413 A1* | 8/2013 | Berndt | G06F 1/3203 |
| | | | 713/310 |
| 2013/0254588 A1* | 9/2013 | Fujieda | G06F 11/2023 |
| | | | 714/4.11 |
| 2014/0181490 A1 | 6/2014 | Campbell et al. | 713/2 |
| 2017/0230179 A1 | 8/2017 | Mannan et al. | |
| 2018/0267858 A1* | 9/2018 | Bacha | G06N 3/045 |
| 2019/0005274 A1 | 1/2019 | Field et al. | |
| 2019/0156039 A1 | 5/2019 | Harsany et al. | |
| 2019/0166032 A1* | 5/2019 | Inbaraj | H04L 43/16 |
| 2020/0097057 A1* | 3/2020 | Tseng | H05K 7/1492 |
| 2020/0143047 A1 | 5/2020 | Shivanna | |
| 2020/0279043 A1 | 9/2020 | Thornton et al. | |
| 2021/0110037 A1 | 4/2021 | Hunt et al. | |
| 2021/0111887 A1 | 4/2021 | Higley et al. | |
| 2022/0376911 A1 | 11/2022 | Ruffino et al. | |

FOREIGN PATENT DOCUMENTS

| | | | | |
|---|---|---|---|---|
| EP | 2642388 A1 | 9/2013 | ............. | G06F 11/20 |
| EP | 2645294 A1 | 10/2013 | ............. | G06F 21/57 |
| EP | 3486824 A1 | 5/2019 | ............. | G06F 21/56 |

OTHER PUBLICATIONS

International Search Report and Written Opinion, Application No. PCT/EP2021/073538, 11 pages, dated Dec. 9, 2021.
International Search Report and Written Opinion, Application No. PCT/EP2022/064351, 11 pages, dated Dep. 28, 2022.
Taylor, Michael A. et al., "Sensor-Based Ransomware Detection," Future Technologies Conference, URL: https://saiconference.com/Downloads/FTC2017/Proceedings/112_Paper_254-Sensor-based Ransomware_Detection.pdf, pp. 794-801, Nov. 30, 2017.
Hull, Gavin et al., "Ransomware Deployment Methods and Analysis: Views from a Predictive Model and Human Responses," Crime Science, vol. 8, No. 1, 22 pages, Feb. 12, 2019.
International Search Report and Written Opinion, Application No. PCT/EP2022/064122, 12 pages, dated Aug. 30, 2022.
U.S. Non-Final Office Action, U.S. Appl. No. 17/396,927, 23 pages, dated Dep. 1, 2022.
U.S. Non-Final Office Action, U.S. Appl. No. 17/751,074, 31 pages, dated Oct. 20, 2022.
U.S. Non-Final Office Action, U.S. Appl. No. 17/750,528, 22 pages, Mar. 6, 2024.

* cited by examiner

CENTRALIZED SERVER MANAGEMENT FOR SHADOW NODES

PRIORITY

The present application claims priority to U.S. Provisional Patent Application No. 63/070,086 filed Aug. 25, 2020, and to U.S. Provisional Patent Application No. 63/192,400 filed May 24, 2021, the contents of which are hereby incorporated in their entirety.

FIELD OF THE INVENTION

The present disclosure relates to monitoring of the operation of electronic devices and, more particularly, a centralized manager of shadow nodes.

BACKGROUND

Ensuring the integrity of a system against unplanned outages is always a challenge. This may be especially difficult for intricate hardware systems. This can be further complicated by those systems using multiple subsystems to build the final product that require a high level of reliability.

Typical computer designs based on PC standards for servers and clustered servers do not have fine-grained control of power and remote hardware resource activation.

By having fine-grained control of hardware configuration and activation through power or shutdown or standby configuration, inventors of embodiments of the present disclosure have discovered systems that enable activation as needed. Subsections of hardware, computers, storage devices, or network connections allow fine-grained resource activation as needed.

DETAILED DESCRIPTION

Embodiments of the present disclosure may include an apparatus. The apparatus may be implemented as a network controller node in a network of nodes, or as a peer to other nodes in a network of nodes. Each of the nodes may be implemented in any suitable manner, such as be servers, computers, or any other suitable electronic device. Each of the nodes may include operating environments. The operating environments may include a motherboard and a processor. Each of the nodes may include a BMC. The BMCs may be implemented in any suitable manner, such as by analog circuitry, digital circuitry, instructions for execution by a processor, or any suitable combination thereof. The BMC of the apparatus may include circuitry configured to determine that another node (which may be implemented as a server) is in standby mode. In the standby mode in the other node, the operating environment is powered down and the BMC is powered only through a connection to the BMC of the apparatus. The BMC may include circuitry further configured to determine that additional resources for execution by a system including the apparatus are to be activated. The additional resources may include memory, processing power, or any other suitable computing resources. The BMC may include circuitry further configured to determine to, based on the determination that additional resources for execution by a system including the apparatus are to be activated, send a control signal to another BMC. The control signal may be configured to send a wake-up signal to the other BMC. The control signal may be configured to instruct the other BMC to wake at least a portion of the other BMC's operating environment. The control signal may be further configured to provision the operating environment of the other BMC.

In combination with any of the above embodiments, the BMC of the apparatus may further include circuitry configured to determine that yet another server or node is in an active mode. The yet another server or node also includes a BMC and operating environment including a motherboard and a processor. In the active mode, the operating environment of the yet another server or node may be powered up. The BMC of the apparatus may further include circuitry configured to determine that resources for execution in the yet another server are to be deactivated. The resources may include any suitable computing resources, such as processing power or storage. The BMC of the apparatus may further include circuitry configured to send a signal to the BMC of the yet another server or node to deprovision the determined resources to be deactivated.

In combination with any of the above embodiments, the BMC of the apparatus may further include circuitry configured to determine that the other server is to be activated based on the determination that the yet another server is to be deactivated.

In combination with any of the above embodiments, the BMC of the apparatus may further include circuitry configured to generate the control signal for the BMC of the other server to provision the other server with a configuration of yet another server based upon the determination that the yet another server is to be deactivated.

In combination with any of the above embodiments, the BMC of the apparatus may further include circuitry configured to cause the BMC of the other server to wake the operating environment therein through a power-up sequence specific to the elements of the operating environment therein.

In combination with any of the above embodiments, the BMC of the apparatus may further include circuitry configured to generate the control signal for the other BMC to power on only a subset of the operating environment therein.

In combination with any of the above embodiments, the BMC of the apparatus may further include circuitry configured to wake the BMC of the other server through an out-of-band channel unavailable to the operating environment therein.

Alone or in combination with any of the above embodiments, the apparatus may include a communications interface. Moreover, the apparatus may include a management server. The management server may be implemented in analog circuitry, digital circuitry, instructions for execution by a processor, or any suitable combination thereof. Thus, the management server may include circuitry, referencing any of these possibilities. The management server may include circuitry configured to access any two servers through the communications interface. The management server may include circuitry configured to determine that additional resources are needed for execution by a system including the servers. The management server may include circuitry configured to determine that a first server is in a standby mode, and powered only through a connection to another node. The management server may include circuitry configured to determine that additional resources for execution by the system from the first server are to be activated. The management server may include circuitry configured to cause a wake-up signal to be sent to the BMC of the first server. The wake-up signal may be configured to cause the BMC to wake the operating environment and to provision the operating environment therein.

In combination with any of the above embodiments, the management server may include circuitry configured to access a third server. The management server may include circuitry configured to determine that the third server is in a normal mode wherein the third operating environment is powered up, determine that resources for execution by the system from the first server are to be deactivated, and cause a signal to be sent to the BMC of the third server to deprovision the determined resources to be deactivated.

In combination with any of the above embodiments, the wake-up signal may be further configured to cause the BMC of the first server to wake the operating environment therein through a power up sequence specific to the elements of that operating environment.

In combination with any of the above embodiments, the management server may include circuitry configured to determine that additional resources for execution by the system from the first server are to be activated based upon a determination that a third server has been prevented from rebooting due to a security failure.

In combination with any of the above embodiments, the management server may include circuitry configured to monitor usage information from a plurality of monitored servers to determine that a third server of the monitored servers is in a pre-failure state.

In combination with any of the above embodiments, the management server may include circuitry configured to activate the first server as a replacement for the third server.

In combination with any of the above embodiments, the management server may include circuitry configured to select the first server from a set of candidate replacement servers as a replacement for the third server based on a most closely matching configuration of the first server when compared to the third server.

In combination with any of the above embodiments, the management server may include circuitry configured to provision the first server with a same configuration as the third server based on a determination that the third server is in the pre-failure state.

In combination with any of the above embodiments, the management server may include circuitry configured to provision the first server with the same configuration as the third server before the third server fails.

Embodiments of the present disclosure may include an article of manufacture. The article of manufacture may include a non-transitory machine-readable medium. The medium may include instructions. The instructions, when loaded and executed by a processor, may cause the processor to perform the operations of any of the above embodiments.

Embodiments of the present disclosure may include methods performed by any of the above embodiments.

Figure 1:
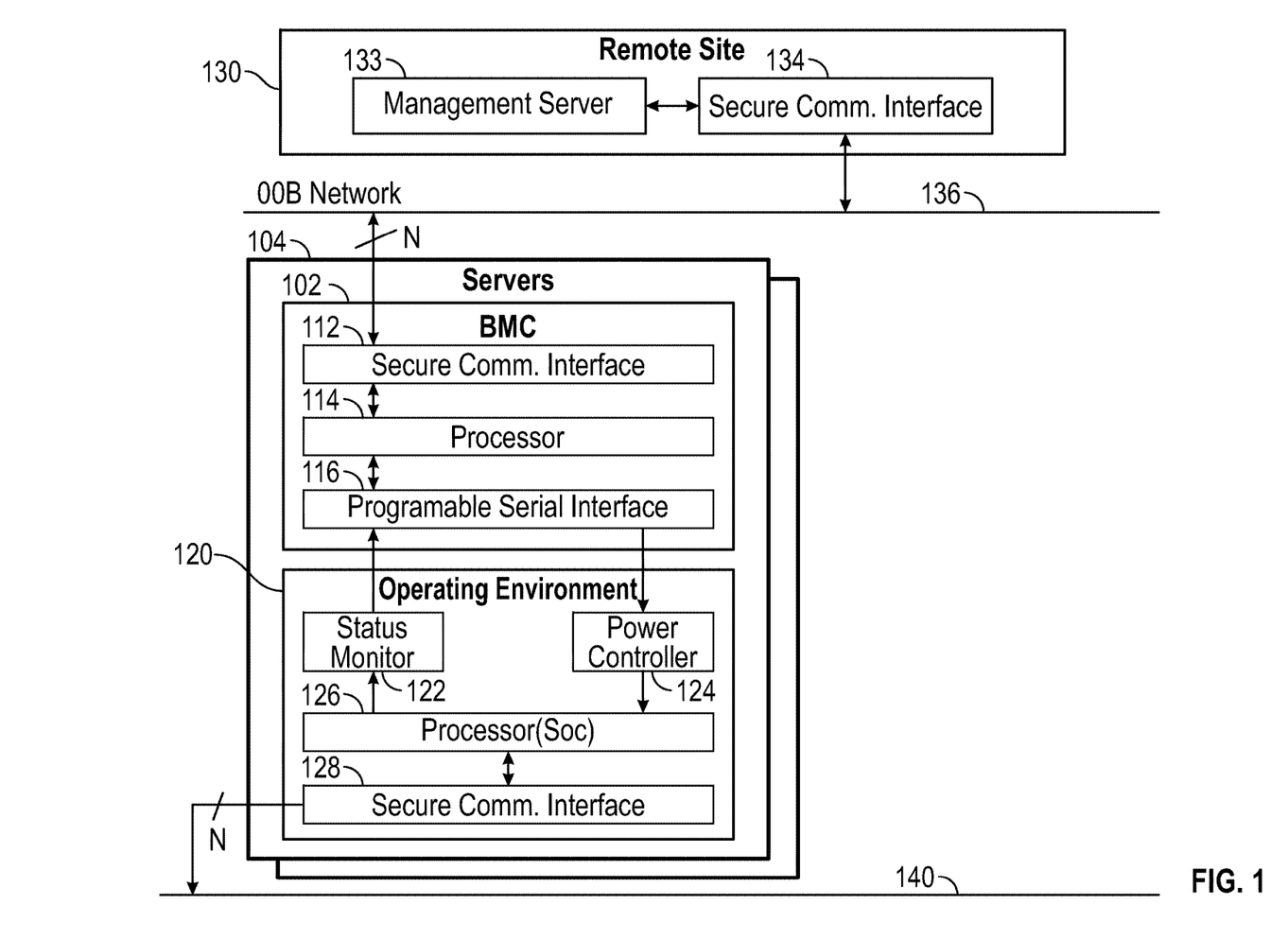
FIG. 1 is an illustration of an example system for shadow mode operation, according to embodiments of the present disclosure.

FIG. 1 is an illustration of an example system 100 for shadow mode operation, according to embodiments of the present disclosure.

System 100 may include one or more servers 104 communicatively coupled together. Servers 104 may be communicatively coupled in any suitable manner. Servers 104 may be communicatively coupled together through any suitable network or protocol.

In one embodiment, servers 104 may be communicatively coupled through a network 140. Network 140 may be considered a production and delivery network. Network 140 may be implemented by, for example, Ethernet or another suitable network.

In one embodiment, servers 104 may also be communicatively coupled through an out-of-band (OOB) network 136. OOB 136 network may include, for example, a wireless network, non-production local area network, or another suitable network. OOB 136 may be implemented by communication through portions of server 104 that are independent of the main processors of server 104, as discussed in further detail below.

Server 104 may include a BMC 102 and an operating environment 120. In one embodiment, server 104 may be configured to operate in an active mode. In the active mode, server 104 may be operational and able to process data. In another embodiment, in the active mode, server 104 may be in a powered-down mode, but able to wake itself via its own processor in operating environment 120. In one embodiment, server 104 may be configured to operate in a shadow mode. In shadow mode, server 104 might not be operational or processing user data, as it is powered down. Furthermore, in the shadow mode, server 104 might not be able to wake itself via its own processor in operating environment 120. Being powered-down may involve the complete removal of local power, with the exception of a power-on external switch circuit. This state may include, for example, Advanced Configuration and Power Interface (ACPI) sleep state G3.

BMC 102 may be implemented in any suitable manner. For example, BMC 102 may be implemented by analog circuitry, digital circuitry, instructions for execution by a processor, or any suitable combination thereof. BMC 102 may be configured to provide a variety of services for the baseboard (also known as a motherboard) or larger system or server where it is installed, such as server 104.

BMC 102 may include a secure communications interface (SCI) 112. SCI 112 may be implemented in any suitable manner, such as by analog circuitry, digital circuitry, instructions for execution by a processor, or any suitable combination thereof. SCI 112 may be configured to provide communication through OOB network 136 and for any suitable network protocol.

BMC 102 may include its own processor 114. Processor 114 may be implemented in any suitable manner, such as by a microprocessor, microcontroller, field-programmable gate array, or application-specific interface circuit.

BMC 102 may include a programmable serial interface (PSI) 116. PSI 116 may be implemented in any suitable manner, such as by analog circuitry, digital circuitry, instructions for execution by a processor, or any suitable combination thereof. BMC 102 may be configured to utilize PSI 116, or any other suitable interface such as a USB interface, Ethernet interface, or any suitable wired or wireless interface to communicate with operating environment 120 of server 104.

Operating environment 120 may include its own processor. The processor may be implemented as a System on a Chip (SoC), a microprocessor, microcontroller, field-programmable gate array, or application-specific interface circuit. The processor may be referred to herein as SoC 126.

Operating environment 120 may include a status monitor 122, which may be implemented in any suitable manner, such as by analog circuitry, digital circuitry, instructions for execution by a processor, or any suitable combination thereof. Status monitor 122 may be configured to provide information about operating environment 120 to BMC 102. Such information may include, for example, storage media failure reports, memory failure reports, processor usage data, fan performance data, and various temperature measurements.

Operating environment 120 may include a programmable power controller 124, which may be implemented in any suitable manner, such as by analog circuitry, digital circuitry, instructions for execution by a processor, or any suitable combination thereof. Power controller 124 may be configured to accept commands from BMC 102 and to power on portions of operating environment 120, such as SoC 126.

Operating environment 120 may include SCI 128. SCI 128 may be implemented in any suitable manner, such as by analog circuitry, digital circuitry, instructions for execution by a processor, or any suitable combination thereof. SCI 128 may be configured to provide communication through operating environment 120 and for any suitable network protocol.

Figure 2:
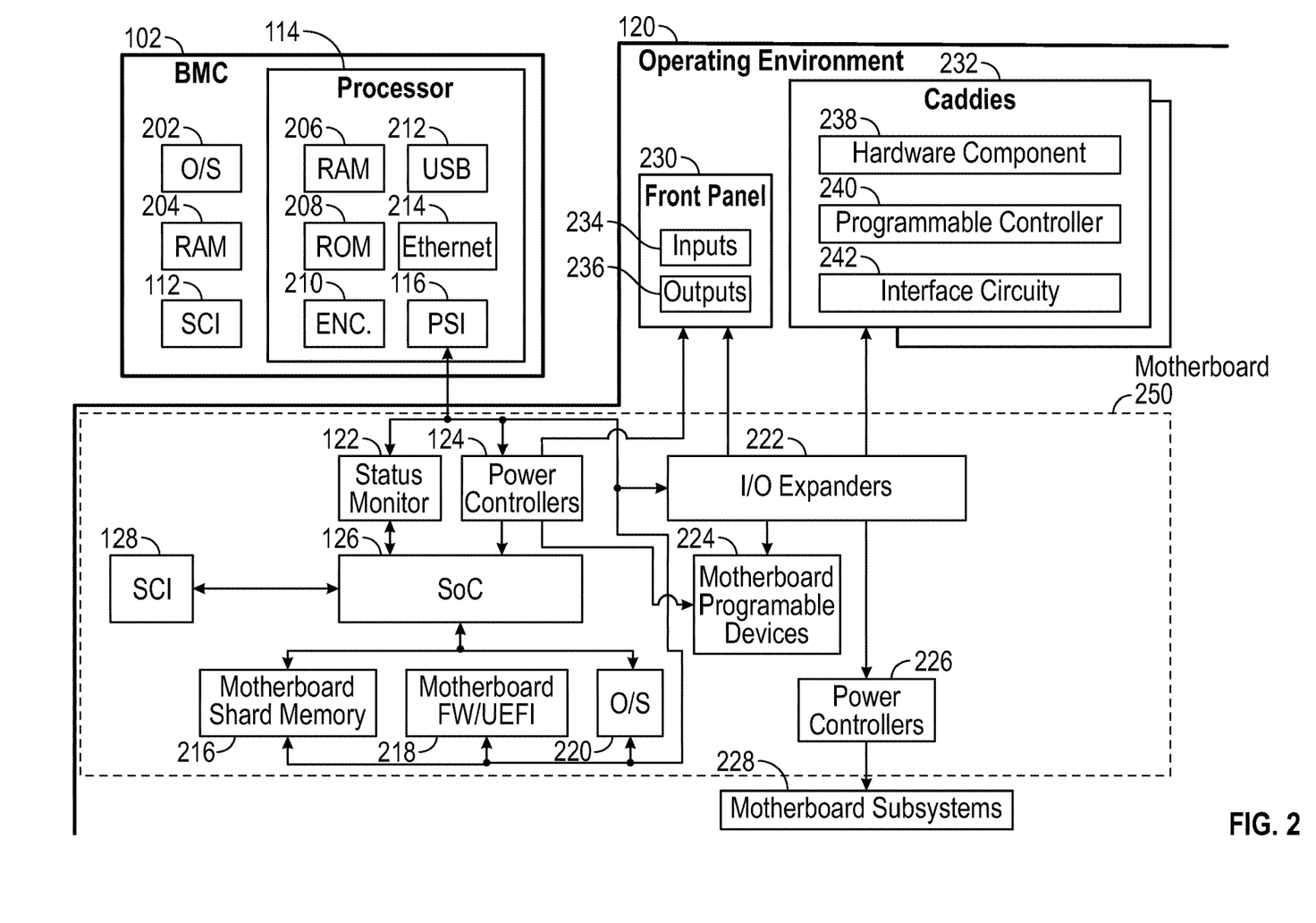
FIG. 2 is a more detailed illustration of a server, including a baseboard management controller (BMC) and an operating environment, according to embodiments of the present disclosure.

FIG. 2 is a more detailed illustration of server 104, including BMC 102 and operating environment 120, according to embodiments of the present disclosure.

BMC 102 may be a self-contained microcontroller system. BMC 102 may be configured to provide a variety of services for the baseboard (also known as a motherboard) or larger system or server where it is installed, such as server 104.

BMC 102 may include its own operating system 202 and a random-access memory (RAM) 204. Processor 114 may include its own volatile or non-volatile RAM 206, a read-only memory (ROM) 208, an encryption module 210, USB interfaces 212, and Ethernet interfaces 214.

USB and Ethernet interfaces 212, 214 may be used to communicate with other instances of BMC 102 in other servers 104 through OOB network 136.

Server 104 may include its own operating environment 120 including SoC 126 and memory 216 a motherboard 250, caddies 232, front panel 230, subsystems 228, external connections, and other suitable components. Motherboard subsystems 228 may be configured to provide localized functions such as external high-speed communications interfaces for server 104. Front panel 230 may be configured to provide interfaces with motherboard 250 of operating environment 120 such as external displays and to collect external inputs, including manual entry. Caddies 232 may be configured to house various elements, such as storage devices, video processors or network interfaces, or other suitable electronic devices, for server 104.

In one embodiment, BMC 102 may be independent of the rest of server 104. Typically, BMC 102 is designed to work with a specific implementation of a baseboard. This may be realized by a customized design or a specifically designed software implementation. For example, BMC 102 may include a predefined inventory of contents of server 104. One challenge for BMC 102 is the component makeup of the operating environment 120 of server 104. In addition to the main processing core of server 104, additional hardware modules can be added to system server 104. BMC 102 may be configured to identify these subsystems and adapt its function to manage these subsystems. These subsystems need not be explicitly defined at the creation of BMC 102, as new ones can be added to server 104 as they are developed and installed at a later time.

Status monitor 122, although shown as implemented within operating environment 120, may be located within BMC 102. Status monitor 122 may be configured to measure the performance of various components of server 104 and take suitable action therefrom.

A given server 104 may have a myriad of multiple possible configurations. The specific configuration of electronic components therein may affect the current that is to be used by server 104, or a sub-system thereof. Accordingly, to account for this variation, the list of hardware components in a given server 104 or sub-system thereof may be dynamically generated. This may be performed by, for example, status monitor 122 or any other suitable part of system 100. A dynamic hardware tree for the specific configuration of the electronic devices communicatively coupled to BMC 102 may be generated. The tree may be an ordered or hierarchical list of assemblies, sub-assemblies, modules, and components for all modules in system 100, such as "assemblies>>sub-assemblies>>modules>>components" for all modules in the system. The tree may include a board type, revision, or another version identifier for each element. Sample trees are provided below. BMC 102 may load a tree of devices as appropriate. In the advent of any changes in hardware in server 104, this tree can be rebuilt autonomously. BMC 102 may detect when new devices are added or when devices are removed, or when new drivers are added or updated. This may trigger the compilation of a new device tree. BMC 104 can use the single software load to align the driver set to match the current device tree.

To secure an OOB connection, encryption module 210 may implement cryptographic algorithms such as Advanced Standard Encryption (AES), Rivest-Shamir-Adleman (RSA), or other suitable cryptographic algorithms.

SoC 126 may be connected to internal memory resources for firmware & Unified Extensible Firmware Interface (UEFI) 218 and a motherboard operating system 220. External communications may be provided by external USB and Ethernet connectors (not shown) communicatively coupled to SCI 128. Additional functions may be provided by SoC 126 but are not shown.

Ethernet interface 214 and USB interface 212 from BMC 102 may connect to separate external USB and Ethernet motherboard connectors (not shown) of operating environment 120. In addition to providing external communications capabilities to BMC 102, these interfaces can also be used to provide operating power when the local server power is not available—such as in Advanced Configuration and Power Interface (ACPI) sleep state G3. Power may be provided to power controllers 124 of operating environment 120 by BMC 102.

BMC 102, by virtue of processor 114, may have its own operating system. This may be contained partially in internal ROM 208 and may be shown as embedded operating system 202. This may allow BMC 102 to operate independently from operating environment 120.

PSI 116 in BMC 102 may be used to control various devices in operating environment 120. PSI 116 may be configured to access—through I/O expanders 222—motherboard shared memory 216, motherboard firmware & UEFI 218, and motherboard operating system 220. SoC 126 can be physically disconnected from motherboard shared memory 216, and motherboard firmware & UEFI 218 using one of motherboard programmable devices 224. Motherboard programmable devices 224 may be implemented by switch circuitry or power relays and may include SoC memory isolation and determination of versions of server components. When disconnected, this may give BMC 102 sole access control over these components.

I/O expanders 222 may allow PSI 116 to access various elements of operating environment 120. For example, PSI 116 may access motherboard subsystems 228, front panel 230, caddies 232, programmable power controllers 224, and motherboard programmable devices 224. Programmable power controllers 124, 226 may provide power to SoC 126, front panel 23, caddies 232, motherboard subsystems 228, and any other suitable components. Using programmable power controllers 124, 226, BMC 102 can selectively control the power of various elements of server 104. This can include removal of power from SoC 126 while leaving power on to motherboard shared memory 216 and motherboard firmware & UEFI 218. BMC 102 can remove power from front panel 230 to prevent any external inputs 234 or outputs 236 from operating. BMC 102 can remove power to caddies 232 to disable various hardware components 238, thus, for example, powering down hard drives. BMC 102 can remove power to motherboard subsystems 228 to power down communications interfaces therein. In addition to removing power to disable server functions, BMC 102 can also put individual components in powered down modes when they are not needed.

Returning to FIG. 1, system 100 may further include a remote site 130. Remote site 130 may be connected remotely from one or more of servers 104. The connection may be made to BMCs 102 through OOB network 136, or to operating environments 120 through network 140 (not shown).

System 100 may include a management server 132 configured to connect to servers 104 through OOB network 136. Management server 132 may be implemented in any suitable manner, such as analog circuitry, digital circuitry, instructions for execution by a processor, or any suitable combination thereof. In one embodiment, management server 132 may be implemented within remote 130. In another embodiment (not shown), management server 132 may be implemented in instances of BMC 102 throughout system 100 in a distributed manner. Management server 132 may be configured to connect to servers 104 through an SCI 134. OOB network 136 may include, for example, a wireless network, non-production local area network, etc. Connections to OOB network 136 may be made, for example, through Ethernet or USB. BMC 102 may be configured to be powered locally on server 102, or instead externally through OOB network 136. The power of OOB network 136 may be provided by, for example, Power Over Ethernet (POE) or USB Power Delivery (USB PD). Thus, even if the remainder of server 104 is switched off, BMC 102 may be powered on remotely by management server 132. Moreover, in turn, using power controllers 124, 226, BMC 102 may be configured to selectively power-on components of operating environment 120. Power controllers 124, 226, or a portion thereof, can be controlled and receive power from an independently powered BMC 102. This will allow BMC 102 to, using power controllers 124, 226, activate/deactivate local power for server 104.

Figure 3:
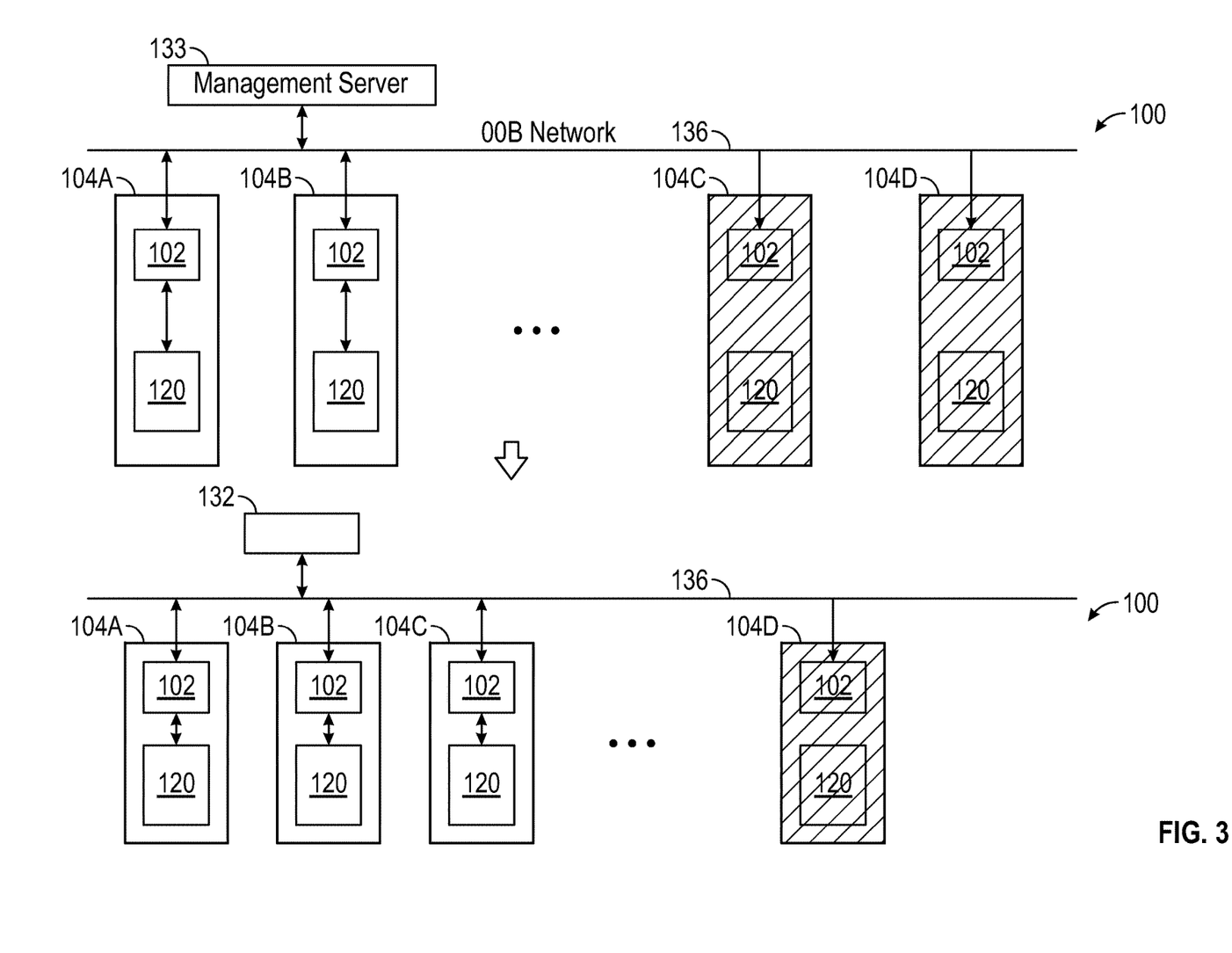
FIG. 3 is an illustration of a system with some servers configured as active nodes and some servers configured as shadow nodes, according to embodiments of the present disclosure.

FIG. 3 is an illustration of system 100 with some servers 104 configured as active nodes and some servers 104 configured as shadow nodes, according to embodiments of the present disclosure.

In the example of FIG. 3, servers 104A, 104B may initially be configured as active nodes, and servers 104C, 104D may be initially configured as shadow nodes.

As active nodes, servers 104A, 104B may be powered on, or at least in states wherein operating environments 120 are operating or are able to wake themselves. As shadow nodes, servers 104C, 104D may be powered off. Servers 104C, 104D might not have the ability to wake themselves.

A given shadow node, such as server 104C, may be configured to be selected by an active node (such as servers 104A, 104B, and the BMC 102 therein) or management server 132, and powered on. The powering on of a shadow node may be performed by selecting the BMC 102 of the given shadow node and providing power to the BMC 102 of the given shadow node over OOB network 136. The selected BMC 102 may then in turn power on portions of its respective operating environment 120 from an external power source. This may cause the respective server to become an active node. For example, in FIG. 3, server 104C, initially configured as a shadow node, may have a BMC 102 that is powered on through OOB network 136 at the request of another BMC 102 (such as of server 104A) or at the request of management server 132.

Management server 132 may be configured to access BMCs 102 in any active node or shadow node. In an active node, such as in servers 104A, 104B, management server 132 may be configured to utilize the SCI 112, processor 114, and PSI 116 of BMC 102 to access operating environment 120 of the active node. Status monitor 122 may be configured to provide information from operating environment 120, such as from power controller 124, SoC 126, and other elements to management server 132. Management server 132 may utilize BMC 102 to configure operating environment 120.

BMC 102 may be configured to load and update a universal driver library from management server 132 to inventory and configure the elements of operating environment 120. BMC 102 may utilize PSI 116 to access and thus determine the inventory of hardware components of operating environment 120. The universal library of device drivers may provide support for all hardware available to be implemented within the server configuration. When a server component is changed, BMC 102 can detect the new hardware configuration and install the required hardware driver from the universal library directly into motherboard firmware & UEFI 219. In one embodiment, using OOB network 136, management server 132 can communicate with BMC 102 and maintain the universal library through updates. This can be accomplished even if operating environment 120 is powered down in, for example, Advanced Configuration and Power Interface (ACPI) sleep state G3. BMC 102 can individually isolate and power system memories such as motherboard shared memory 216 or motherboard firmware & UEFI 218. Drivers can then be loaded without powering any additional server components. The new drivers will be available when operating environment 120 powers up and boots into normal operation.

In certain circumstances, a server 104 can enter a non-responsive state. This may arise from, for example, a malfunction within the hardware or software of server 104, or from the action of malicious software. In this state, server 104 might not be able to perform its normal operations or communicate within itself. Using BMC 102, hardware and software in portions of operating environment 120 can be queried using PSI 116 without the involvement of SoC 126. This may allow remote management server 132 to attempt to collect a last known good configuration of server 104. Remote management server 132 may utilize BMC 102 to collect this information. BMC 102 may be configured to query elements of operating environment 120 to determine a last known good state of the element. BMC 102 may be configured to verify configurations of hardware, software, or firmware of the elements of operating environment 120. BMC 102 may be configured to power down specific operating environment components. These components can remain powered down, even after a subsequent reboot. BMC 102 may be configured to perform system diagnostics, at a granular level, with or without SoC 126 being powered on. BMC 102 may be configured to collect logging information directly from motherboard shared memory 216. This information may be provided to management server 132. Using this collected data, management server 132 can derive the last known good state of server 104, even though server 104 may be non-responsive.

In cases wherein a server 104 has been prevented from functioning, an alternate instance of server 104 can be activated. Management server 132 may have already collected and or have access to the last known good configuration of the failed, original server 104. Management server 132 may configure another server 104 that is presently a shadow node 106 to replace the failed server. The server 104 to be activated may be implemented with, or adjusted to be implemented with, a same configuration as the failed server. The server 104 to be activated may be turned from a shadow node to an active node and then replace the original server. The new active node may be returned to a production environment and resume the operation of the original server. The original server, now deactivated, may be isolated from network 140 such that it is still available for future diagnosis.

Management server 132 may use status monitor 122 on various active nodes of servers 104. The information from status monitor 122 may include, for example, storage media failure reports, memory failure reports, processor usage data, fan performance data, and various temperature measurements. Based on this information, management server 132 may use an algorithm to predict whether any of servers 104 is likely to fail or run out of resources. Management server 132 may determine which server 104 is most likely to fail or run out of resources. Management server 132 may collect this performance data over time for many connected systems. A machine learning model, or algorithm, may be used to process this data. Management server 132 may use these models to detect a subjective state of "pre-failure" where server performance has not degraded measurably, but nonetheless, failure may be predicted. This system failure prediction may predict a future state of failure based on historical trends, data, and usage statistics collected from multiple servers. Therefore, specific servers can be identified as being in the pre-failure state.

Management server 132 may utilize status monitor 122 to maintain current configuration and performance information for a respective server 104 that is an active node. The configuration information may include the configuration of the respective SCI 128 connected to network 140. This may include, for example, networking parameters such as Internet Protocol (IP) addresses or other settings. This or similar information may also be included in a motherboard subsystem 228. The information may include data on SoC 126 hardware, such as a number of cores, device identification, or clock speed. The information may include version and revision levels of motherboard firmware & UEFI 218. The information may include version and revision levels of BMC 102. The information may include power control settings of components of server 104. The information may include information about hardware component 238, such as hard drive type, size, and configuration. The information may include operating software configuration such as application and operating system parameters.

This information may be used to define the configuration of a given server 104 so that a shadow node may be selected among servers 104, wherein the selected shadow node as a replacement best matches the given server 104. The selected shadow node may be further configured to provide capabilities that are as close of a match as possible.

If a server 104 is identified as being in a pre-failure state, then it may have a configuration that is already known by management server 132. Management server 132 may then take actions to mitigate the potential failure of that server 104 and determine the best or best approximation of the configuration needed to replicate it. Management server 132 can then select the appropriate shadow node that would be able to best support the needed configuration of the server 104 to be replaced. Once a shadow node is selected to replace server 104, the configuration of server 104 may be downloaded to the BMC 102 of the replacement server 104. Because BMC 102 is independent of operating environment 120, the replacement server 104 can otherwise remain in a completely powered down state, such as ACPI G3. In the event of a complete failure of the server 104 to be replaced, a preconfigured shadow node instance of a server 104 can be booted using existing information that best matches information known about the original server 104 before failure. This may include the last known good operating configuration of a failed active node server 104. Moreover, selection of the appropriate server 104 of the shadow nodes may be made while the main server is powered down. The selection may be performed by the BMC 102 which, with remote power, may be active.

As discussed above, BMC 102 may be configured to facilitate software-driven hardware additions to existing computers, computer clusters, or resources for computers. This may be in association with hardware activation, removal of hardware, setting hardware into standby, or adding power to hardware. The hardware may include entire servers 104 or portions of operating environments 120. Lowering of power may be performed because, for example, hardware is no longer needed. Lowering of power may be performed because, for example, a sub-hardware or resource is not needed, such as an individual hard drive or memory unit, or a portion of CPUs on a given server 104. This may have the result of increasing the effective life of servers 104 and components thereof because powered-down resources are not consuming mean time before failure (MTBF) time. Hardware resources may be scaled up or down as needed. A resource pool of servers 104 and hardware thereof that is initially provisioned may be deactivated to become shadow nodes but may yet remain available to be reactivated later as active nodes. The power footprint for a shadow node may be negligible as the only active component may be a manual power-on circuit. This scaling capability may allow management server 132 to select a specific shadow node that most closely matches an active node server 104 to be replaced. Thus, a smaller number of shadow nodes may accommodate a larger number of active nodes.

A need for additional resources in a shadow node to be activated may be made in any suitable manner. The need may be identified by any suitable triggering event. The triggering event may arise from a cluster or a computer and may be a request for more or fewer computers or more or fewer quantified resources. The trigger may be software-defined and may arise from categorized or profiled use cases. The identified change in need may arise from different applications and may be for an entire computer or server (e.g., adding or subtracting an entire server), or storage (e.g., Ceph), or other resources, such as graphical processing units (GPUs), CPUs, solid-state disks, or hard drive disks. A given BMC 102 in an active node server 104 may recognize these changed needs. BMC 102 may be configured to change its own operating environment 120 or to signal to other BMCs 102 in shadow nodes to change their own operating environments 120 to meet the changed need. For example, a BMC 102 in an active node may recognize additional CPUs or hard drive space is needed and wake another BMC 102 in a shadow node, which may activate the additionally needed CPUs or hard drive space in its respective operating environment 120. These may also be powered down and put to sleep when not needed. In another embodiment, the need may be recognized by management server 132, which may wake the BMC 102 in the respective shadow node.

A given BMC 102 may make use of embedded BMC cryptographic functions to allow management server 132 to remotely validate an activation of a shadow node server 104 and control it remotely. For example, a vendor can see a user request activation that is received by management server 132. Management server 132 can enforce any suitable credentials or purchases so as to digitally or cryptographically enable activation of a shadow node for a user. This may be performed automatically, on-demand, or according to user profiles that are stored in management server 132. Policies to be applied may include incremental use requirements and associated activations, fail-over or back-up, or any other suitable resource allocation. These policies may be stored and managed by management server 132.

The shadow nodes of servers 104 from which additional resources may be added need not be all of a same cluster type, which may be the case for active nodes requiring such additional resources. The cluster type can be determined from configuration information uploaded from BMCs 102 to management server 132. For example, given a pool of available clusters such as computing, network, or storage clusters, shadow nodes from a given cluster may be activated to support active nodes from another cluster. In a given cluster, multiple servers or nodes may be used to provide an overall computing feature. For example, in a given CEPH cluster, multiple individual servers might each have between 10-500 TB of storage capacity, and the overall cluster might have 1 PB of storage capacity. Such a cluster, with 1 PB of storage capacity, may predict that a given server therein has an unacceptably high risk of failing. Management server 132 may activate a shadow node from servers 104. However, the shadow node may be presently assigned to another cluster. However, the other cluster might not presently need the storage capacity of the shadow node. Moreover, a 1:N relationship of active node servers to shadow node servers may exist for activation. For example, given a single signal from management server 132, an additional ten shadow node servers could be activated. Using the above example, if a server with 500 TB is predicted to fail, 10 shadow nodes with a combined storage of 500 TB may be activated. Thus, entire cold or shelved data centers with generic shadow nodes may be built and await activation for different clusters.

In activating a shadow node, any suitable boot process may be used. For example, a shadow node may allow UEFI code to boot from storage resources, local or remote, allowing build-out of the activated nodes. In another example, the BMC 102 of a newly activated node may request or receive information from a previously or already active BMC 102 on another server 104. The information may define the resources or general application provisioning of the existing active node, or of yet another active node that is failing or about to fail. For example, a given server 104 may have failed or may be reaching capacity, and the newly activated server 104 may be provisioned with identical IP addresses and take over for the failing server 104. The already active server 104 may provide the necessary drivers and firmware to the newly activated server 104. On bootup, these drivers may be pulled out of local or remote memory for BMC 102 on the newly activated server 104 and installed. If a given driver is not needed for a profile, it might not be loaded.

BMC 102 might only activate a shadow node partially. BMC 102 may generate a command to, for example, only power up preliminary or baseline components of operating environment 120. For example, only half of the available memory, hardware, caddies, or other components might be powered on.

In operation, management server 132 may configure and control shadow nodes for system 100. BMC 102 may send a request to management server 132. This request may indicate the resources needed for operation. Server 104 may need additional resources, may have failed, or may imminently fail. Management server 132 may select a suitable shadow node server 104 based on inventory identified in management server 132. The BMC 102 of a selected shadow node may be self-contained from a functional perspective, wherein BMC 102 may be configured to obtain power separately from server 104 through an Ethernet or USB connection over OOB network 135. This may be in contrast with other server architectures, which may experience problems in obtaining remote access to the server when the operating environment is not active or is functioning incorrectly. In such other architectures, a monitoring system uses the same power and functional components as the rest of the server components. Accordingly, if the power were removed from these components, such as SoC, memory, or a communications interface, then no remote access can be obtained.

BMC 102 may be configured to perform various other tasks autonomously upon operating environment 120. BMC 102 may be configured to create, enable, or disable user accounts on operating environment 120. BMC 102 may be configured to query the power status of operating environment 120. BMC 102 may be configured to power on or power off portions of environment 120, including a soft shutdown. BMC 102 may be configured to set network addresses and other settings of environment 120, such as IP addresses.

We claim:
1. An apparatus, comprising:
a communications interface; and
a management server comprising circuitry configured to:
 access a first server and a second server through the communications interface, wherein:
  the first server is to include a first baseboard management controller (BMC) and a first operating environment including a first motherboard and a first processor; and
  a second server is to include a second BMC and a second operating environment including a second motherboard and a second processor;
 determine that additional resources are needed for execution by a system including the servers;
 determine that the first server is in a standby mode, wherein the first operating environment is powered down and the first BMC is provided power only through a connection from the apparatus;

determine that additional resources for execution by the system from the first server are to be activated; and cause a wake-up signal to be sent to the first BMC, the wake-up signal configured to cause the BMC to wake the first operating environment and to provision the first operating environment.

2. The apparatus of claim 1, wherein the management server is further configured to:
access a third server, the third server including a third BMC and a third operating environment including a third motherboard and a third processor;
determine that the third server is in a normal mode wherein the third operating environment is powered up;
determine that resources for execution by the system from the third server are to be deactivated; and
cause a signal to be sent to the third BMC to deprovision the determined resources to be deactivated.

3. The apparatus of claim 1, wherein the wake-up signal is further configured to cause the first BMC to wake the first operating environment through a power up sequence specific to the elements of the first operating environment.

4. The apparatus of claim 1, wherein the management server is further configured to determine that additional resources for execution by the system from the first server are to be activated based upon a determination that a third server has been prevented from rebooting due to a security failure.

5. The apparatus of claim 1, wherein the management server is further configured to monitor usage information from a plurality of monitored servers to determine that a third server of the monitored servers is in a pre-failure state.

6. The apparatus of claim 5, wherein the management server is further configured to activate the first server as a replacement for the third server based upon the determination that the third server of the monitored servers is in the pre-failure state.

7. The apparatus of claim 5, wherein the management server is further configured to select the first server from a plurality of candidate replacement servers as a replacement for the third server based on a most closely matching configuration of the first server when compared to the third server.

8. The apparatus of claim 5, wherein the management server is further configured to provision the first server with a same configuration as the third server based on a determination that the third server is in the pre-failure state.

9. The apparatus of claim 8, wherein the management server is further configured to provision the first server with the same configuration as the third server before the third server fails.

10. A method, comprising, at a management server:
accessing a first server and a second server on a network, wherein:
the first server is to include a first baseboard management controller (BMC) and a first operating environment including a first motherboard and a first processor; and
a second server is to include a second BMC and a second operating environment including a second motherboard and a second processor;
determining that additional resources are needed for execution by a system including the servers;
determining that the first server is in a standby mode, wherein the first operating environment is powered down and the first BMC is provided power only through a connection from the apparatus;
determining that additional resources for execution by the system from the first server are to be activated; and
causing a wake-up signal to be sent to the first BMC, the wake-up signal configured to cause the BMC to wake the first operating environment and to provision the first operating environment.

11. The method of claim 10, further comprising:
accessing a third server, the third server including a third BMC and a third operating environment including a third motherboard and a third processor;
determining that the third server is in a normal mode wherein the third operating environment is powered up;
determining that resources for execution by the system from the first server are to be deactivated; and
causing a signal to be sent to the third BMC to deprovision the determined resources to be deactivated.

12. The method of claim 10, wherein the wake-up signal is further configured to cause the first BMC to wake the first operating environment through a power up sequence specific to the elements of the first operating environment.

13. The method of claim 10, further comprising determining that additional resources for execution by the system from the first server are to be activated based upon a determination that a third server has been prevented from rebooting due to a security failure.

14. The method of claim 10, further comprising monitoring usage information from a plurality of monitored servers to determine that a third server of the monitored servers is in a pre-failure state.

15. The method of claim 14, further comprising activating the first server as a replacement for the third server based upon the determination that the third server of the monitored servers is in the pre-failure states.

16. The method of claim 14, further comprising selecting the first server from a plurality of candidate replacement servers as a replacement for the third server based on a most closely matching configuration of the first server when compared to the third server.

17. The method of claim 14, further comprising provisioning the first server with a same configuration as the third server based on a determination that the third server is in the pre-failure state.

18. The method of claim 17, further comprising provisioning the first server with the same configuration as the third server before the third server fails.

* * * * *